April 12, 1949.  M. M. CULVER  2,466,688
CLOTHESLINE REEL
Filed Feb. 6, 1946
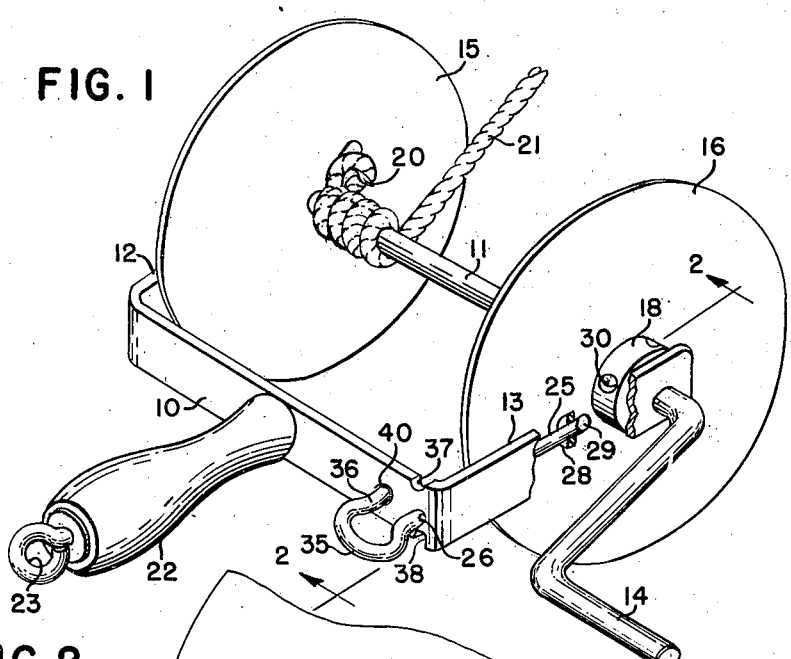
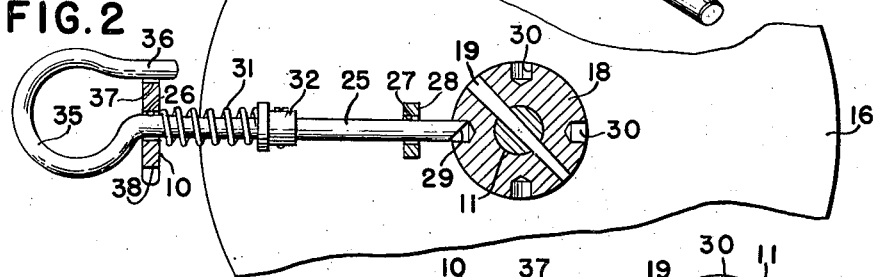
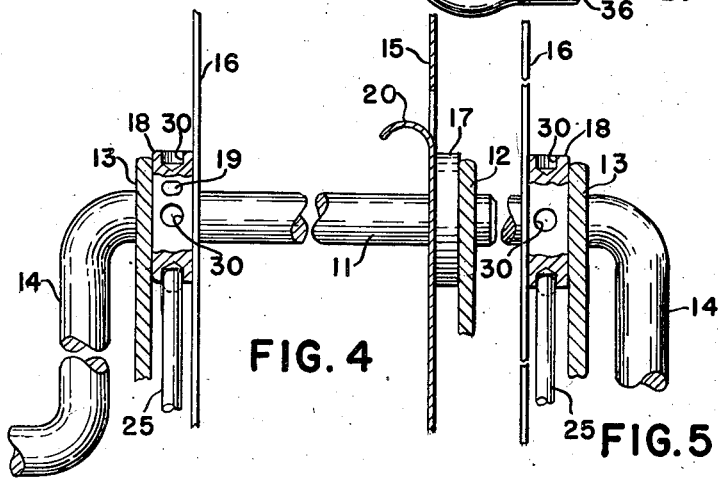
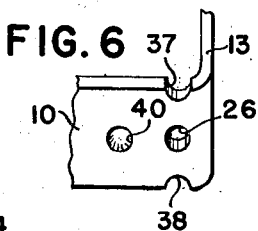
INVENTOR
MERLYN M. CULVER
BY
Toulmin & Toulmin
ATTORNEYS Patented Apr. 12, 1949

2,466,688

UNITED STATES PATENT OFFICE 2,466,688

CLOTHESLINE REEL

Merlyn M. Culver, Dayton, Ohio, assignor to Midwest Aircraft Products, Inc., Dayton, Ohio, a corporation of Ohio Application February 6, 1946, Serial No. 645,829

4 Claims. (Cl. 242—100)

This invention relates to a reel for holding a large quantity of rope such as a reel for holding clothes line.

An object of the invention is to provide an improved form of a reel that can be operated by either a left-handed or right-handed person.

Another object of the invention is to provide a reel upon which cord may be wound with an improved and simplified mechanism which provides the functions of a ratchet to allow rotation of the reel in either direction and alternately to lock the reel from rotation according to the selected direction of rotation of the reel, and which mechanism is selectively operable to adapt the reel for rotation by either a left-handed or right-handed person.

Another object of the invention is to provide an improved and simplified ratchet mechanism for a reel that is selectively positionable to perform ratcheting of the device in either direction of rotation of the reel with locking upon counter-rotation and positionable to be operably disengaged from the reel so that the reel can be freely rotated in either direction without operation of the ratchet mechanism.

Figure 1 is a perspective elevational view of a reel upon which cord can be wound, incorporating an improved form of ratchet and locking mechanism of this invention.

Figure 2 is a cross-sectional view taken substantially along line 2—2 of Figure 1, and which illustrates the arrangement of the mechanism for operation of the reel by a right-handed person.

Figure 3 is a cross-sectional view of the ratchet and lock mechanism illustrating the position of the same when the reel is set for operation by a left-handed person.

Figure 4 is a cross-sectional view of the device shown in Figure 1, showing the same in position for operation by a left-handed person.

Figure 5 is a cross-sectional view of a portion of the device illustrated in Figure 1, showing the mechanism in position for operation by a right-handed person.

Figure 6 is an elevational perspective view of a portion of the bracket of the reel illustrating the detents therein for holding the combination ratchet and locking rod in selected positions.

In this invention, the reel consists of a U shaped metal frame 10 that is provided with a shaft 11 journaled in the legs 12 and 13 of the U shaped frame 10. The shaft 11 is bent into the form of a handle 14 for rotating the same.

A pair of metal discs 15 and 16 is carried upon the shaft 11 and the discs have bushings 17 and 18 respectively secured thereto. The bushings 17 and 18 are secured to the shaft 11 by means of suitable pins 19 that may be tapered for driving into a tapered hole, passing through the bushings and the shaft 11.

The disc 15 is provided with an inturned portion 20 to which one end of a cord 21 may be attached to prevent the cord from leaving the reel.

The frame 10 is provided with a handle 22 that carries a shank through the same, on one end of which there is located an eye 23, the opposite end of the shank passing through a hole in the base of the frame 10 and lapped over to hold the handle 22 upon the frame 10. The eye 23 is adapted to be inserted over a hook when stretching the clothes line or cord 21.

To adapt the reel for rotation by either a left-handed or right-handed person, there is provided a ratchet and lock mechanism that is selectively positioned to permit ratcheted rotation of the reel in either direction with positive locking upon reverse rotation in both selected positions of the mechanism. Also, the mechanism is positionable to render the same ineffective for holding the reel against rotation in either direction, and thereby permit free rotation of the reel in both directions.

The ratchet and lock mechanism consists of a rod 25 slidably positioned within a hole 26 provided in the frame 10 and a hole 27 provided in an ear 28 formed from or attached to the arm 13 of the frame 10. The ratchet and lock rod 25 has the inner end thereof provided with a tapered end portion 29 that is received in radially drilled recesses 30 provided in the bushing 18 attached to the disc 16. The rod 25 is normally urged in forward position, as shown in Figure 2, by a compression spring 31 retained between the frame 10 and a collar 32 secured to the rod 25. The tapered forward end 29 of the rod 25 is arranged so that the peripheral edges of the recesses or holes 30 will engage the tapered surface 29 to cause the rod 25 to be ratcheted upwardly of the holes 30 when the bushing 18 is rotated in a clock-wise direction, as viewed in Figure 2. It will be obvious that when the rod 25 is positioned within the holes 30, as viewed in Figure 2, that counter-clockwise rotation of the bushing 18 is prevented. Thus, the device is arranged for rotation by a right-handed person, as viewed in Figure 2, the handle 14 being positioned on the right-hand side of the device, as viewed in Figure 1.

To retain the ratchet and lock rod 25 in the position illustrated in Figure 2, the ratchet and lock rod 25 is provided with a loop 35 on the end thereof that has an extending portion 36 receivable in either of two recesses, 37 and 38, provided in the opposite edges of the base of the frame 10. With the extension 36 or the loop 35 in the upper recess 37, as shown in Figure 2, the ratchet rod 25 will be prevented from rotation and will thus move through a straight axial reciprocal movement.

To adapt the reel for operation by a left-handed person, the loop 35 is drawn to the left, as viewed in Figure 2, to release the extension 36 from the recess 37 and is rotated until the extension 36 will enter the recess 38, as viewed in Figure 3. With the ratchet and lock rod 25 in the position illustrated in Figure 3, it will be apparent that the lock rod will be ratcheted upon counter-clockwise rotation of the bushing 18 and will be prevented from rotation in a clockwise direction, as viewed in Figure 3. Thus, with the device set in this position the reel can be turned over so that the handle 14 will be on the left-hand side of the device, as indicated in Figure 4, thereby allowing a normal rotation of the device by a left-handed person in the same manner as the device can be rotated by a right-handed person with the handle on the right-hand side of the device. The loop 35 with its extension 36 also provides means for indicating to the operator whether the ratchet and lock rod 25 is set for left or right handed operation, in view of the fact that extension 36 will be positioned in the recess 37 or 38 that is on the upper edge of the frame 10 with the reel in either selected position.

If it is desired to rotate the reel in either direction, or to allow for free rotation of the reel when unwinding the same, the extension 36 of the loop 35 can be positioned with the end thereof in a shallow recess 40 provided upon the face of the frame 10, as illustrated in Figure 1, whereby the ratchet and lock rod 25 will be withdrawn from operative engagement with the collar 18, whereby the reel can be freely rotated in either direction.

While the device disclosed herein constitutes a preferred form of the invention, yet it will be understood that the device is capable of modification without departing from the spirit of the invention and that all modifications that fall within the scope of the appended claims are intended to be included herein.

Having thus fully described my invention, what I claim as new and desire to secure by Letters Patent is:

1. In a reel, a U-shaped frame with the base of the U extending transversely across the reel, a spool having a shaft journaled in said frame, ratchet mechanism comprising a cylinder secured to said shaft and having a plurality of recesses in the periphery thereof and a locking rod journaled in the base of said frame and extending radially of said cylinder, said rod having a cam face on one end thereof to engage said recesses for ratchet action thereover in one direction of rotation of said spool with locking action in the opposite direction, and a position selector on the opposite end of said rod, position setting means on the said base of said frame, said position selector cooperating with said position setting means for positioning said rod to allow ratchet operation of said spool in either direction.

2. In a reel, a U-shaped frame with the base of the U extending transversely across the reel, a spool having a shaft journaled in said frame, ratchet mechanism comprising a cylinder secured to said shaft and having a plurality of recesses in the periphery thereof and a locking rod journaled in the base of said frame and extending radially of said cylinder, said rod having a cam face on one end thereof to engage said recesses for ratchet action thereover in one direction of rotation of said spool with locking action in the opposite direction, and a position selector comprising a loop on the opposite end of said rod, position setting means on the said base of said frame, said position selector cooperating with said position setting means for positioning said rod to allow ratchet operation of said spool in either direction and to position the said locking rod out of engagement with said cylinder whereby to allow free rotation of said spool.

3. In a reel, a U-shaped frame with the base of the U extending transversely across the reel, a spool having a shaft journaled in said frame, ratchet mechanism comprising a cylinder secured to said shaft and having a plurality of recesses in the periphery thereof and a locking rod journaled in the base of said frame and extending radially of said cylinder, said rod having a cam face on one end thereof to engage said recesses for ratchet action thereover in one direction of rotation of said spool with locking action in the opposite direction, and a position selector on the opposite end of said rod, position setting means comprising recesses on the said base of said frame, said position selector cooperating with said position setting means for positioning said rod to allow ratchet operation of said spool in either direction.

4. In a reel, a U-shaped frame with the base of the U extending transversely across the reel, a spool having a shaft journaled in said frame, ratchet mechanism comprising a cylinder secured to said shaft and having a plurality of recesses in the periphery thereof and a locking rod journaled in the base of said frame and extending radially of said cylinder, said rod having a cam face on one end thereof to engage said recesses for ratchet action thereover in one direction of rotation of said spool with locking action in the opposite direction, and a position selector on the opposite end of said rod, position setting means comprising recesses on the said base of said frame, said position selector cooperating with said position setting means for positioning said rod to allow ratchet operation of said spool in either direction, said position selector comprising a loop and an extension on the loop adapted to selectively engage one of said recesses.

MERLYN M. CULVER.

REFERENCES CITED

The following references are of record in the file of this patent:

UNITED STATES PATENTS

| Number | Name | Date |
| --- | --- | --- |
| 468,563 | Fletcher | Feb. 9, 1892 |
| 640,342 | Wilkinson | Jan. 2, 1900 |
| 1,099,517 | Schwanengel et al. | June 9, 1914 |
| 1,387,156 | Igo et al. | Aug. 9, 1921 |
| 2,053,458 | Black | Sept. 8, 1936 |